United States Patent [19]

Sheldon, III et al.

[11] 4,226,179

[45] Oct. 7, 1980

[54] APPARATUS FOR APPLYING SPROUT INHIBITOR

[75] Inventors: Dwight M. Sheldon, III, Richland; F. Lee Beezhold, Seattle, both of Wash.

[73] Assignee: Kenneth T. Place, Corvallis, Oreg.

[21] Appl. No.: 960,876

[22] Filed: Nov. 15, 1978

[51] Int. Cl.³ .................................................. A23B 4/04

[52] U.S. Cl. .......................................... 99/475; 55/15; 55/228; 55/238; 55/277; 55/259; 55/487; 261/79 A; 426/312; 426/419; 99/516

[58] Field of Search ................... 55/2, 15, 90, 92, 228, 55/227, 235–239, 259, 277, 487; 261/79 A, 116–118; 99/475, 516; 426/312, 419

[56] References Cited

U.S. PATENT DOCUMENTS

| | | | |
|---|---|---|---|
| 1,895,652 | 1/1933 | Fisher | 261/79 A |
| 2,575,359 | 11/1951 | Ortgies | 55/236 |
| 3,522,692 | 8/1970 | Brookman et al. | 55/259 |
| 3,763,634 | 10/1973 | Alliger | 261/118 |
| 3,854,468 | 12/1974 | Nozaki | 261/79 A |
| 3,860,401 | 1/1975 | Clark et al. | 55/92 |
| 4,059,419 | 11/1977 | Ross | 55/92 |
| 4,067,703 | 1/1978 | Dullien et al. | 55/92 |
| 4,070,424 | 1/1978 | Olson et al. | 55/15 |
| 4,078,480 | 3/1978 | Luck | 99/516 |
| 4,144,040 | 3/1979 | Claes et al. | 55/487 |

FOREIGN PATENT DOCUMENTS

| | | | |
|---|---|---|---|
| 345937 | 8/1972 | U.S.S.R. | 55/238 |

*Primary Examiner*—Bernard Nozick
*Attorney, Agent, or Firm*—Chernoff & Vilhauer

[57] ABSTRACT

A method and apparatus for application of sprout-inhibiting chemical agents to surface-sprouting produce. Liquid sprout-inhibiting chemical such as isopropyl N-3 chlorophenylcarbamate (CIPC), either without solvent or with a relatively small amount of solvent, is atomized at a temperature less than 250° F. to form an aerosol of liquid particles. The aerosol is preferably formed in a fogger having a cylindrical mist chamber in which ultrasonic resonance nozzles atomize the chemical agent. A tangentially introduced air flow and a helical baffle plate in the mist chamber cause centrifugal separation and leave smaller particles near the center of the mist chamber. A chamber contains a supply of sprout-inhibiting chemical and also collects chemical agent of such large particle size that it has been separated from the aerosol. A thermostatically controlled heater located in the sump warms the sprout-inhibiting chemical in the sump to a temperature above ambient but below 250° F. prior to its being pumped to the atomizer nozzles to reduce its viscosity without thereby also decomposing the chemical.

4 Claims, 8 Drawing Figures

APPARATUS FOR APPLYING SPROUT INHIBITOR

BACKGROUND OF THE INVENTION

After harvesting but prior to processing, potatoes and other surface-sprouting edible produce such as sweet potatoes, yams, beets, carrots, turnips, rutabagas and radishes are often stored for appreciable periods of time. During such storage sprouting often occurs, frequently destroying or impairing the quality and processing value of the produce.

To inhibit such sprouting and prevent bacterial decomposition, such produce is normally stored at cool temperatures, e.g., in the case of potatoes preferably between about 42° and 50° F., although temperatures outside this range may also be used, and a sprout-inhibiting chemical agent, preferably isopropyl N-3 chlorophenylcarbamate (CIPC), is periodically applied to the surfaces of the produce by circulation of an aerosol of a solution of CIPC in a harmless organic solvent such as a vegetable oil. A method for the use of this chemical agent is disclosed in Plant U.S. Pat. No. 3,128,170, which teaches application of an aerosol of isopropyl N-3 chlorophenylcarbamate dissolved in a water soluble organic solvent and atomized into liquid droplets of 1–10 micron diameter.

It has previously been considered a problem of distribution of the CIPC that, in a technically pure form, CIPC is a crystalline solid at normal storehouse temperatures. To solve this problem, prior methods such as that disclosed by the foregoing Plant patent have taught that the chemical should be dissolved in a solvent which can carry the CIPC in solution during formation of an aerosol, yet which will not adversely affect the stored produce. It is now most common for the CIPC to be carried by hygroscopic organic solvents such as vegetable oil, isopropyl alcohol, ethylene glycol or propylene glycol. The use of such solvents has also been necessary to reduce the normally high viscosity of the CIPC to the point where the chemical may be broken down into extremely small aerosol particles by previously available mechanical methods. The small droplet size is particularly necessary to permit the CIPC to be carried by air circulation systems within a storehouse without excessive harmful and wasteful deposition of the solvent on storehouse and air circulation system surfaces, and to provide even distribution of the CIPC over all the exterior surfaces of stacked produce. The maximum droplet diameter is about 10 microns for distribution without undesired deposition in the distribution conduits and the storehouse. Droplet diameters of 5 microns or less are preferred, since smaller droplets are more uniformly distributed by circulation of the aerosol through stacked produce.

What has not previously been recognized is that it is advantageous for the minute droplets of CIPC solution to crystallize while suspended in air, since the crystals are less likely than the liquid droplets to adhere to one another and agglomerate, thus inhibiting distribution throughout the produce, or to adhere to distribution ducts and storehouse walls. Use of a substantial amount of solvent, as taught for example by Plant, inhibits crystallization, thereby encouraging agglomeration and deposit of the CIPC solution on air ducts and storehouse surfaces, thereby obstructing air distribution duct work, wasting sprout-inhibiting chemicals, and creating a fire hazard. Plant, however, is forced to use a substantial amount of solvent in order to reduce the viscosity to achieve sufficiently small droplet size for uniform distribution of the sprout-inhibiting chemical, using the high-speed disc type of atomizing method and apparatus disclosed. This high-speed rotating disc method, which is capable of producing droplets small enough for distribution only if sufficient solvent is used, is also limited as to its rate of aerosol production and is accompanied by production and circulation of a considerable proportion of droplets of larger size than is desirable.

Partly because of some of the foregoing deficiencies of methods such as that disclosed by Plant, the presently most common method of forming the aerosol is atomization of a CIPC and solvent solution by a thermal fogger, a process which involves combustion of the solution in compressed air, accompanied by rapid expansion of the products of combustion. The thermal fogger operates similarly to a rocket engine, and includes a pressure chamber containing compressed air and a glowplug located nearby an exit nozzle in the pressure chamber. The sprout-inhibiting solution is introduced into the compressed air near the glowplug, which causes ignition due to the combustibility of the solution. As the burning solution expands through the exit nozzle, most of the solvent is burned and rapid expansion atomizes the mixture into a very fine mist. The mist produced has a very desirable range of sizes of particles, including only about 25% by weight in the range greater than 5 microns diameter and about 60% by weight in the range smaller than 1 micron in diameter.

A major disadvantage of use of the thermal fogger, however, is that it heats the CIPC to temperatures in the range of 700° to 900° F. and above. It has been discovered by the present inventors that, at temperatures above about 250° F., the CIPC decomposes chemically. In fact, the predominant compound found in chromatographic analysis of a thermal fogger-produced mist was not CIPC but M-chloro aniline. Additional breakdown products were also produced, some of which are as yet unidentified by ordinary gas chromotograph methods. The result of the thermal fog-producing process is decomposition of up to 80% of the sprout inhibiting chemical; that is, of the portion of the resultant fog which can be identified as CIPC or products of its decomposition, as little as 20% is CIPC. Still more CIPC may be further decomposed to carbon, carbon oxides, etc. not traceable to the original CIPC.

As particle size decreases, the relative amount of decomposition apparently increases, with the result that the smaller particles contain a much smaller proportion of the sprout inhibiting CIPC than the larger ones. Therefore, although the overall distribution of the particles produced by the thermal fogger is quite impressive, the distribution of droplets of the non-decomposed sprout inhibiting chemical is far less desirable. A very significant proportion of the CIPC is in the form of the relatively large droplets which tend to drop from air suspension too quickly to be effectively circulated throughout the stored produce. Because of the foregoing chemical decomposition problems characteristic of the thermal fogger method of aerosol production, an excessively large amount of the chemical is needed to provide minimum concentration of the sprout-inhibiting chemical at some points within the stacks of stored produce, while unnecessarily high concentrations are achieved at other points. High temperatures encountered in the thermal fogging system also tend to warm the produce in storage to an undesirably high temperature during application of the chemical agent, which is conducive to growth of bacteria which may cause spoilage of the stored potatoes.

A method and device for producing a dry vapor, i.e., an aerosol composed of suspended droplets, predominantly less than 1 micron in diameter, is disclosed in Clark U.S. Pat. No. 3,860,401. A liquid spray aspirator nozzle is used by Clark to produce droplets of a relatively non-viscous liquid constituent of an aerosol for treating air, and particularly for controlling odor in hospitals. The droplets are mixed with air within a vertically extending centrifugal vortex separator. The Clark apparatus, however, has no apparent means for sufficiently atomizing oily or viscous liquids, such as CIPC, which is difficult to separate into extremely small particles without substantial amounts of solvent which inhibit crystallization of the CIPC. The Clark apparatus also appears to be a low-volume atomizer, and thus inappropriate for application of a chemical agent to a large quantity of stored produce.

Although it is known that production of smaller aerosol droplets of sprout-inhibiting chemical solutions ensures more uniform distribution of the chemical through stacked produce, and also helps to reduce the amount of the chemical solution deposited uselessly on storehouse and/or air conduit surfaces, an efficient method and apparatus of producing such small particles without requiring a substantial amount of solvent and at low enough temperatures to prevent significant decomposition of the chemical has not previously been known.

What is needed, therefore, is an apparatus for efficiently treating stored produce with a sprout-inhibiting agent in the form of an aerosol having droplets whose diameters are less than about 10 microns, and preferably less than 5 microns, at temperatures low enough to prevent any significant chemical decomposition of the sprout-inhibiting agent and without requiring the use of solvents in amounts which substantially inhibit crystallization of the aerosol droplets when exposed to storehouse ambient temperature.

SUMMARY OF THE INVENTION

The aforementioned objectives of an apparatus for applying sprout-inhibiting chemicals to produce in storage are met by the apparatus of the present invention, resulting in more efficient production and more uniform and effective application of an aerosol of a sprout-inhibiting chemical agent, less deposition of chemical on storehouse and air duct surfaces and thus less waste of chemical, less requirement for cleaning and less fire hazard, and minimizing chemical decomposition of the sprout-inhibiting chemical agent.

In the preferred method of practicing the invention, a sprout-inhibiting liquid chemical agent comprising isopropyl N-3 chlorophenylcarbamate (CIPC), either without any solvent or with a minimum amount of a suitable organic solvent such as a vegetable oil, is heated to a temperature which reduces the viscosity of the agent without causing chemical breakdown of the CIPC. The liquid agent is then atomized by being passed with pressurized air through sonic resonance nozzles, producing an aerosol including a finely divided mist of droplets of the agent. A supply of ambient circulation air is introduced, moving the aerosol in a downward helix within a cylindrical centrifugal vortex separator and causing the larger particles of the aerosol to flow toward the perimeter of the centrifugal separator, while the predominantly smaller particles of the aerosol proceed through a mechanical scrubber which filters or separates out nearly all the remaining particles above the desired size limit by preventing their passage through the scrubber. The remaining finely atomized aerosol is then circulated through a plenum and thence through perforated circulation conduits under the stacks of produce in the storage area to distribute the aerosol of sprout-inhibiting agent among and around and into contact with the surfaces of the produce. Limitation of the size of aerosol particles to 10 microns or less in diameter provides an aerosol whose particles remain longer in air suspension rather than being deposited on surfaces of the air circulation system fan blading and ducting, or on storage area walls and ceilings, and which is distributed more uniformly on the produce, than is the case with larger particles.

Moreover, minimization or elimination of the solvent more effectively minimizes wasteful and harmful coating of storehouse duct work and interior surfaces by enhancing formation of crystals of the agent as the aerosol is introduced to the cool ambient atmosphere of a produce storehouse. This crystallization also tends to preserve small particle size of the agent by preventing liquid agglomeration, improving the uniformity of the chemical distribution among stored produce.

This method is best carried out by apparatus including nozzles for expanding and thereby atomizing the liquid agent which has been heated to between 70° F. and 250° F., centrifugal and mechanical filtration separation of oversize aerosol particles, and recycling chemical agent thus removed from the aerosol. Preferably the filtered aerosol is distributed through existing storehouse air conditioning duct work, in which case it is desirable to achieve crystallization of the aerosol droplets in the duct work to prevent internal coating thereof. This is achieved, in the absence of inhibiting amounts of the solvent, by exposing the agent to the cool air in the ducts.

The method of the invention thereby simultaneously achieves all of the objectives of more uniform distribution, reduction of the total amount of chemical needed to provide minimum coverage at all points, prevention of chemical decomposition by excessive heat, prevention of harmful coating or clogging of distribution system ducts, prevention of fire hazard and increase of the mass flow rate of sprout-inhibiting chemical to accomplish treatment of stored produce more quickly.

The apparatus used to carry out this method comprises an upright, cylindrical mist chamber having an ambient circulating air supply inlet duct located near the top so as to introduce a tangential flow of circulating air. A fan located near the entrance of the duct supplies circulating air to the mist chamber via the supply inlet and initiates a downward helical air flow directed by a helical baffle plate located within the chamber. At the bottom of the cylindrical mist chamber is a sump for containing a liquid supply of a sprout-inhibiting chemical agent, preferably isopropyl N-3 chlorophenylcarbamate (CIPC) which may be pure or, if necessary to keep the chemical liquid in the nozzles, mixed with vegetable oil or another suitable organic solvent in an amount as small as possible, in order to encourage crystallization of the resultant aerosol particles when exposed to storehouse temperature. The concentration of the chemical agent should, therefore, be greater than 60% by weight, and preferably 75% or more.

A heater located within the sump is thermostatically controlled to automatically maintain the temperature of the liquid agent high enough above ambient air temperature to maintain the agent in liquid form and to reduce the viscosity of the solution to aid in atomization, and yet low enough to prevent chemical decomposition of the agent such as that caused by the prior art thermal fogger. A temperature of 140° F. has been found preferable to achieve an optimum economical reduction of viscosity of CIPC and yet prevent any decomposition, a range of about 70° F. to 250° F. being permissible to retain technically pure CIPC in liquid form in the sump while preventing any significant decomposition thereof.

An outlet pipe conducts the chemical agent from the sump to a pump which provides a pressurized supply of the heated liquid agent to a set of ultrasonic resonance atomizing nozzles. As the level of agent in the sump is reduced by this pumping away of the chemical to the nozzles, an automatic level control valve such as a float valve opens, and additional chemical is supplied to the sump from a reservoir.

Arranged in a helical pattern below the helical baffle plate in the mist chamber is the above-mentioned set of ultrasonic atomizing nozzles. While other types of nozzles capable of atomizing pure liquid CIPC at 250° F. or less to a particle diameter of 10 microns or less are also acceptable, ultrasonic resonance nozzles have exhibited exceptional performance in this application, producing a large proportion of droplets in the less than 5 micron diameter range. A supply of compressed air and the pressurized supply of heated liquid chemical agent are supplied separately but simultaneously to the ultrasonic nozzles, which utilize an intense sonic shock wave to atomize the agent. Although a few fairly large nozzles would be sufficient, a larger number of nozzles each of smaller bore size has been found preferable since the multiple smaller nozzles require a smaller total amount of compressed air to atomize the same amount of liquid.

The aerosol produced by the nozzles is carried downward and centrifugally separated according to droplet weight by the downward helical flow stream of the circulating air supply to the mist chamber produced by the helical baffle plate. In this regard the location of the air supply circulation fan upstream of the nozzles minimizes turbulence downstream of the nozzles which might cause coalescence of the smaller aerosol particles into larger droplets. The helical flow pattern carries the larger, heavier particles outward toward the perimeter of the mist chamber where they coalesce and adhere to the mist chamber wall and eventually flow downward into the sump.

Centrally located within the mist chamber is a scrubber comprising a vertically-oriented cylindrical aerosol uptake conduit extending downward from the top of the mist chamber to a level slightly above the level of the chemical in the sump. This central location has the greatest concentration of the smallest droplets, which are carried upward by flow of the circulating air supply through the scrubber and into a discharge conduit. The scrubber contains scrubbing elements comprising layers of knitted and crimped wire fabric, presenting a very large amount of surface area. Passage of the aerosol over this very large exposed surface area obstructs droplets larger than a predetermined size remaining in the aerosol, causing them to adhere to the surfaces of the knitted wire, where they coalesce and eventually drop back into the sump. Thus only those droplets or particles of the liquid component of the aerosol which are within the maximum predetermined size limit (about 10 microns or less) proceed the entire way through the scrubber.

It is therefore the objective of the present invention to provide an improved apparatus for applying sprout-inhibiting agents to surface-sprouting produce capable of accomplishing all of the following results simultaneously:

(a) achieve a greater and more uniform distribution of sprout-inhibiting agent, while using a lesser amount of such agent to do so, by circulating only small aerosol particle sizes through the produce and encouraging, rather than inhibiting, crystallization of the aerosol particles;

(b) achieve such small particle sizes without the need for crystallization-preventing amounts of organic solvent mixed with the sprout-inhibiting agent, and without the need for temperatures high enough to cause decomposition of the agent;

(c) supply the aerosol at higher volumetric rates while achieving such small particle size; and (d) reduce coating of storehouse and air duct surfaces to thereby reduce waste of chemical, harmful clogging and fire hazards, also by encouraging crystalization of the aerosol particles.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
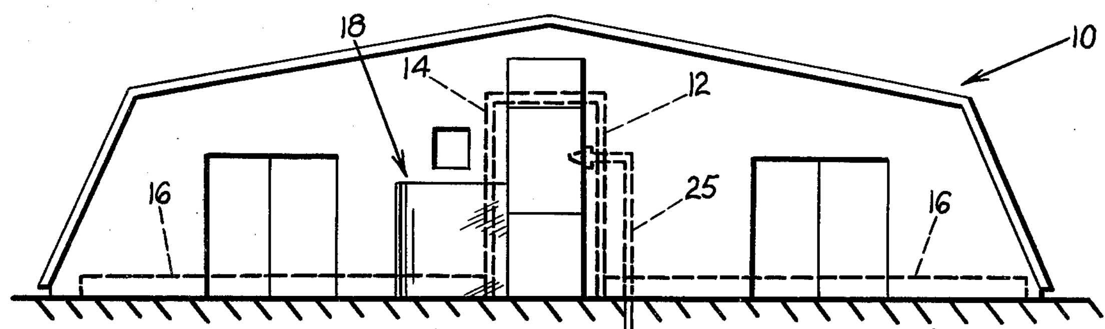
FIG. 1 is a simplified front view of a produce storehouse showing the apparatus of the present invention being used according to the method of the invention to supply an aerosol to the storehouse.

Referring to FIG. 1, a potato storehouse 10, with which the method and apparatus of the application may be used, is seen to comprise an air circulation system indicated generally as 12 having a plenum 14 and distribution conduits 16 which are detachably connected with the plenum 14.

Figure 2:
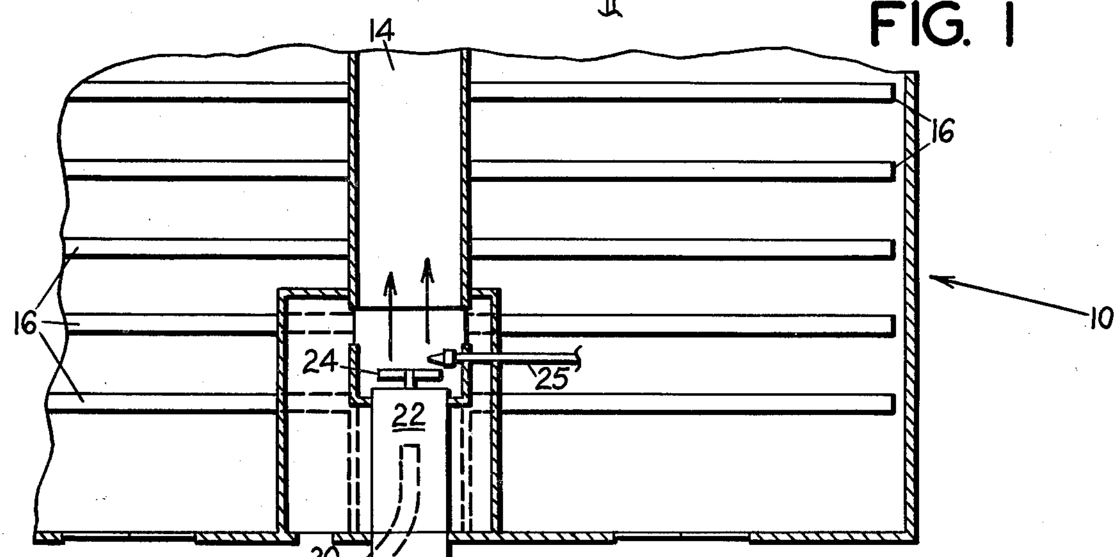
FIG. 2 is a top view of the storehouse with roof removed showing the invention in use in the storehouse.

Referring to FIGS. 1 and 2, a portable fogger 18 embodying the present invention is seen located adjacent the storehouse 10, with a discharge hose 20 of the fogger inserted into an air intake chamber 22 of the air circulation system 12. The air circulation system includes a circulating fan 24 whose forces circulation of cooled and humidified air to produce stored in the storehouse 10. Humidification of the air is normally provided by a water sprayer such as 25, but the water supply is interrupted during operation of the fogger 18 because of the hygroscopic nature of the sprout-inhibiting chemical.

Figure 3:
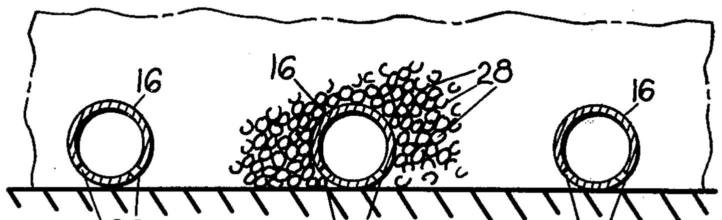
FIG. 3 is a fragmentary view of the storehouse of FIG. 1, including a sectional view of air conditioning circulation conduits installed therein.

Referring to FIG. 3, a cross section of several of the air distribution conduits 16 of the storehouse 10 may be seen, as well as a quantity of potatoes which are stacked over and around the distribution conduits 16. The distribution conduits include air outlet apertures 26 through which humidified air or an aerosol of sprout-inhibiting chemical may be circulated to reach the surfaces of the stored potatoes. Thus an aerosol introduced into the air circulation system 12 by means of the discharge hose 20 of the fogger 18 may be distributed by the fan 24 throughout the stored potatoes by circulation of air through the distribution conduits 16 and the outlet apertures 26 and thence upwardly through the stacks of potatoes so that the aerosol circulates around the individual potatoes and into contact with their surfaces.

Figure 6:
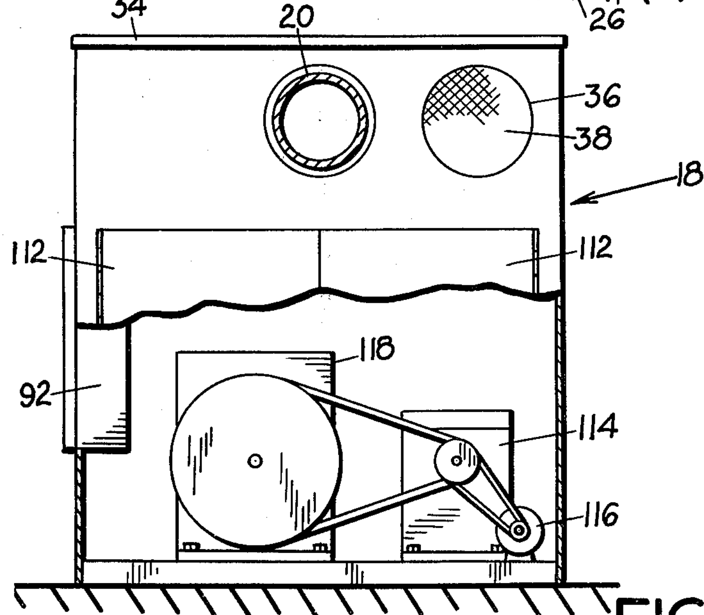
FIG. 6 is a partially cut away end view of the fogger of FIG. 4.
Figure 4:
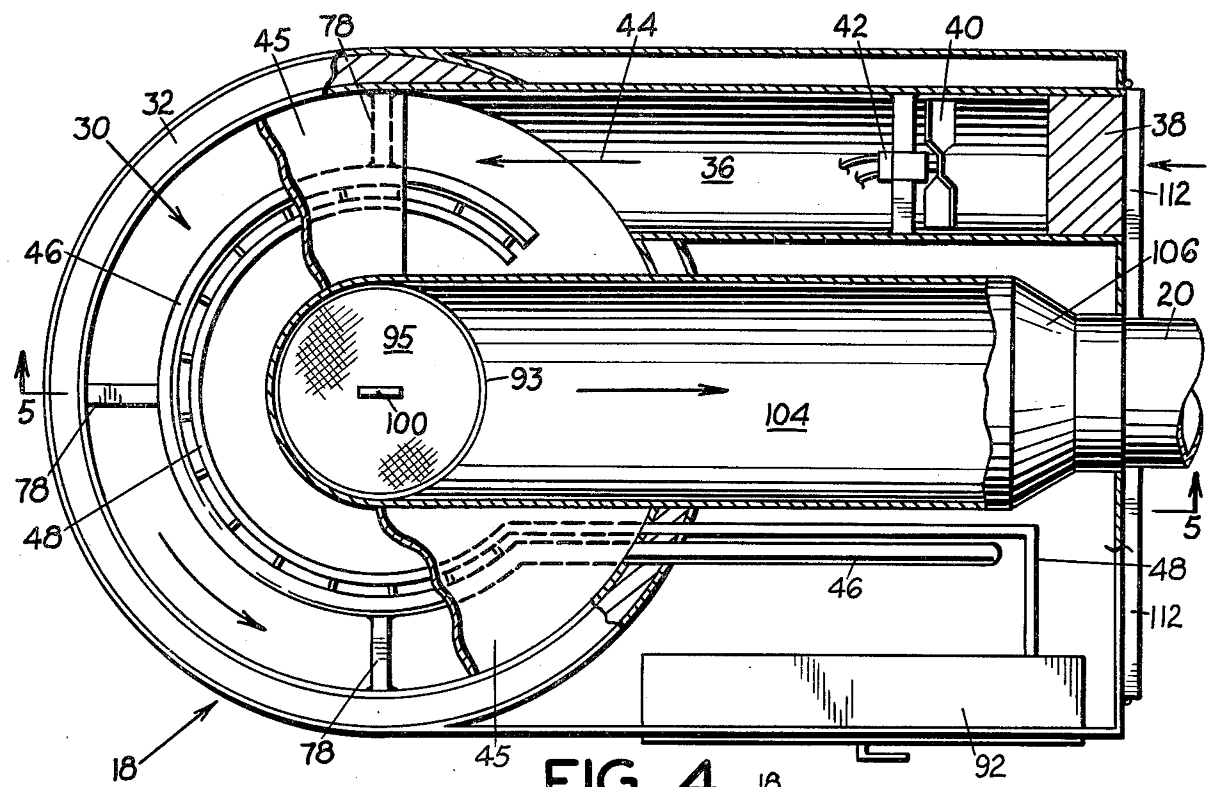
FIG. 4 is a top sectional view of the aerosol-creating fogger of the present invention.
Figure 5:
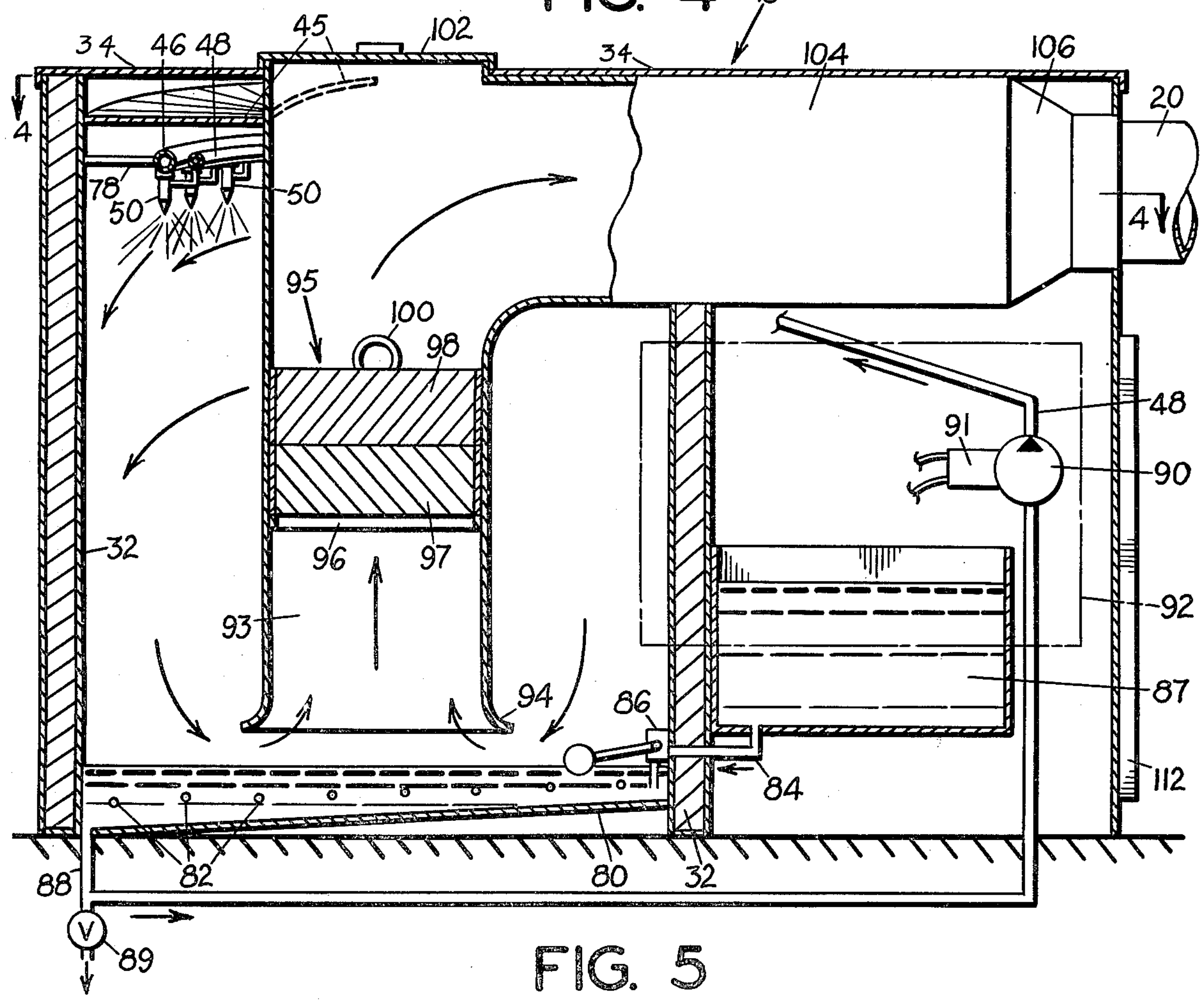
FIG. 5 is a side sectional view of the fogger of FIG. 4.

Referring now to FIGS. 4, 5 and 6, the fogger 18 of the invention may be seen in greater detail. The fogger comprises a cylindrical mist chamber 30 (FIGS. 4 and 5), which has thermally insulated vertical walls 32 and a flat cover 34 which may be of a fiberglass material. Referring to FIG. 4, an ambient air supply inlet duct 36 is tangentially connected with the upper portion of the mist chamber and comprises an intake air filter 38, which may be of the high flow capacity glass fiber mat type, which removes dust and dirt from intake air. An air supply fan 40 is powered by a hydraulic motor 42 and provides a circulating air supply flow into the upper portion of the mist chamber 30 in a tangentially approaching direction as indicated by the arrow 44. A helical baffle plate 45 within the upper portion of the mist chamber directs the air flow into a downward helical flow stream.

Figure 7:
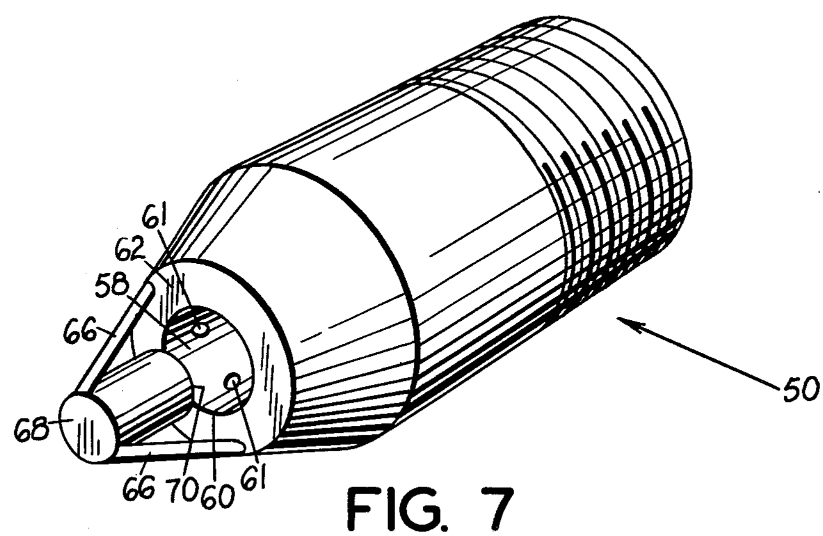
FIG. 7 is a perspective view of an exemplary ultrasonic nozzle which may be used in the fogger of FIG. 4.
Figure 8:
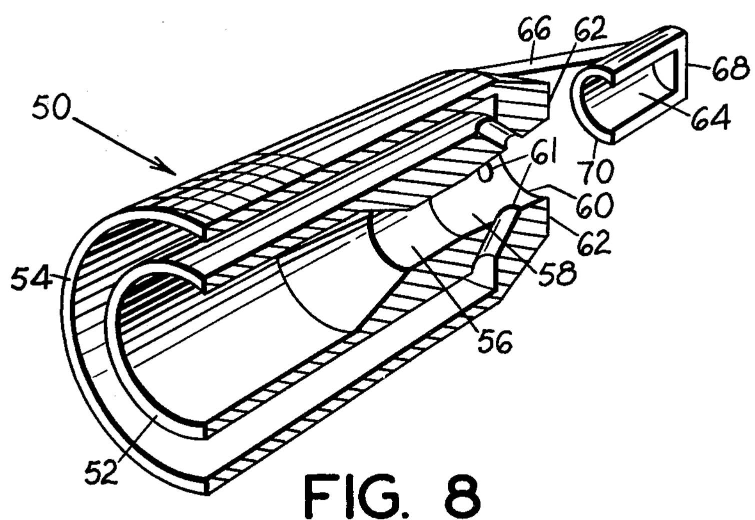
FIG. 8 is a sectional perspective view of the nozzle of FIG. 7.

Arranged in a helical pattern below the baffle plate 45 are a plurality of nozzles 50, preferably of the ultrasonic resonance atomizing type manufactured and distributed by the Sonic Development Company of Upper Saddle River, N.J., and designated by that company as Model Number 035-H, under the trademark Sonicore. FIGS. 7 and 8 show in detail an exemplary nozzle of the type preferred for use in the fogger, such nozzle comprising a pair of concentric chambers formed by an inner housing 52 and an outer housing 54. A supply of gas under pressure is provided through compressed air supply pipe 46 (FIGS. 4 and 5) to the inner housing 52, and a preheated supply of sprout-inhibiting liquid chemical agent is provided through a chemical supply pipe 48 to the outer housing 54. The inner housing 52 converges to a throat 56, which is connected to a slightly diverging portion 58 extending toward an exit aperture 60. A plurality of chemical inlet orifices 61 are arranged circumferentially about, and extend into, the diverging portion 58 of the nozzle throat, communicating between the throat and the outer housing 54. The ends of the inner housing 52 and the outer housing 54 are joined to a flat surface 62 surrounding the exit aperture 60. A resonator cavity 64 attached to the nozzle by a pair of support rods 66 comprises a cylinder having a closed end 68 and an open end 70, the cylinder being oriented coaxially with the nozzle throat 56, with the open end 70 facing toward the exit aperture 60. With this nozzle, it has been found effective to supply an air pressure of about 70 psig and a sprout-inhibiting chemical pressure of about 30 psig.

The compressed air supply pipe 46 and the chemical agent supply pipe 48 are supported within the mist chamber 30 by a plurality of supports 78 which suspend the nozzles in a helical array below the baffle plate 45, so that the aerosol is projected into the helical flow stream of circulating air.

At the bottom of the mist chamber is a sump 80 for containing a ready quantity of liquid sprout-inhibiting chemical. Located within the sump 80 are electric immersion heating coils 82 similar to those ordinarily used in electric water heaters. The heating coils are thermostatically controlled and receive electrical power by conventional means. An inlet pipe 84 for the sprout-inhibiting chemical includes an interconnected float valve 86 which is responsive to the level of the sprout-inhibiting chemical contained within the sump 80, for automatically regulating the transfer of a reserve quantity of sprout-inhibiting chemical from a reservoir 87, which may be similarly heated, located outside the mist chamber at a sufficient height for gravity feed, to maintain the level of sprout-inhibiting chemical contained in the sump at a predetermined level. The sump 80 has a sloping bottom, and an outlet pipe 88 which is located at the lowest part of the bottom of the sump leads therefrom to a chemical feed pump 90, driven by a hydraulic motor 91, which delivers the chemical agent under pressure to the chemical supply pipe 48. A control panel 92 contains conventional gauges and control devices for adjusting pressures and temperatures within the fogger.

Centrally located within the mist chamber 30 and extending downwardly from the top thereof, is an aerosol uptake conduit 93. A flared lower end 94 of the uptake conduit is a short distance, but at least about 3 inches, above the surface of the chemical agent in the sump. At approximately mid-height of the mist chamber, located within the uptake conduit, is a scrubber 95 comprised of two layers of knitted and crimped wire fabric supported by a support bracket 96, and arranged to extend completely across the interior of the aerosol uptake conduit 93. A lower scrubber element 97 removes the largest droplets, and an upper scrubber element 98 of finer fabric removes smaller droplets which are larger than the desired maximum size of 10 microns, and preferably removes all droplets larger than 5 microns. A handle 100 in the top of the filter 95 and an access cover 102 at the top of the mist chamber 30 give access to the filter elements for cleaning or replacement. Knitted and crimped stainless steel wire scrubber elements manufactured by the Otto H. York Co. of Parsippany, N.J., under the trademark "Demister", have been found suitable for this purpose.

Extending horizontally from the uptake conduit above the scrubber elements and parallel to the top of the mist chamber 30 is a discharge conduit 104 leading into an inwardly tapered connector 106, to which is attached the flexible aerosol discharge hose 20.

Turning now to FIG. 6, it may be seen that the air intake duct and the aerosol discharge hose are located near the top of an end of the fogger, and that therebelow are located two service doors 112. Behind the doors 112, as seen in the cut-away portion of FIG. 6, is located a gasoline engine 114, which drives a hydraulic pump 116 and an air compressor 118. The hydraulic pump provides fluid pressure to drive the hydraulic motors 42 and 91 respectively of the air supply fan 40 and the chemical agent feed pump 90, while the air compressor provides compressed air to the atomizer nozzles 50 through pipe 46.

In operation, the fogger of the present invention produces an aerosol of liquid sprout-inhibiting chemical at a temperature below that at which the chemical begins to decompose chemically, i.e. below about 250° F. for CIPC. A predetermined amount of liquid chemical, having a CIPC concentration of at least more than 60% by weight and preferably 75% or more by weight (the remainder being solvent and impurities) so that crystallization at storehouse temperatures of about 42° F.–50° F. is permitted, enters the sump 80 of the mist chamber 30 by action of the float valve 86, which stops the influx of the chemical agent solution at a predetermined level. The heating coils 82 are thermostatically controlled to automatically maintain the temperature of the liquid in the sump at a predetermined temperature setting made at the control panel 92. The preferable temperature is about 140° F., which reduces viscosity substantially to enhance atomization, yet does not produce decomposition. The maximum temperature range to avoid both decomposition and solidification of the chemical in the sump, in view of its high concentration of CIPC and resultant improved tendency to crystallize, is 70° F. to 250° F.

A supply of the heated sprout-inhibiting agent is drawn through the outlet pipe 88 into the pump 90, which feeds the liquid agent under pressure through pipe 48 to the outer housing 54 of each of the sonic resonance nozzles 50. A supply of compressed air from the air compressor 118 is provided to the inner housing 52 of each sonic resonance nozzle 50 by way of the compressed air supply pipe 46. As the air passes through the nozzle throat 56 the chemical agent joins the compressed air in the diverging portion 58 of the nozzle, after which they rapidly expand and encounter an intense shock wave created in a zone of ultrasonic resonance between the exit aperture 60 and the resonator cavity 64. The high concentration of sonic vibration energy accompanying the rapid expansion of the air and chemical agent causes a thorough atomization of the agent into very minute aerosol droplets or liquid particles predominantly less than 10 microns in diameter with a large proportion below 5 microns.

The supply of circulating air tangentially entering the top of the mist chamber through air intake duct 36 is forced by the baffle plate 45 to assume a downward helical flow pattern in order to exhaust through the scrubber. This causes a centrifugal vortex separation effect carrying the larger aerosol particles toward the outer vertical walls 32 of the mist chamber where the large particles tend to coalesce and adhere, thereafter dripping down along the walls to the sump 80 where it is recycled with the other sump liquid. The lighter, smaller particles remaining nearer the center of the mist chamber are drawn upward from near the surface of the liquid in the sump, and pass through the uptake conduit 93 and the scrubber 95. As the aerosol passes through the scrubber 95 the very large surface area presented by the many closely spaced wires within the scrubbing elements 97 and 98 removes still more particles of larger than the desired diameter, as the larger particles inevitably strike against and adhere to the wires in their paths through the scrubbing elements. Thus only the smaller entrained droplets of the chemical agent are able to proceed entirely through the scrubber, the liquid separated by the scrubber from the aerosol dropping into the sump where it is recycled, thereby avoiding any waste of chemical. The aerosol, including circulating air driven by the air supply fan 40 which causes a slight overpressure within the mist chamber, proceeds through the discharge conduit and eventually into the discharge hose. The discharge hose, as illustrated in FIG. 2, introduces the aerosol into the air circulation system of the storehouse 10 allowing circulation throughout and around the potatoes stored therein.

The following example illustrates performance of this invention:

EXAMPLE

Fresh potatoes are stored in a storehouse equipped with an air circulation system such as described above. Air conditioning equipment associated with the air circulation system is used to maintain the air temperature within the storehouse between about 42° F. and 50° F. A solution of CIPC in peanut oil having a concentration of 75% by weight CIPC is heated in the sump of the apparatus of the invention to about 140° F. The solution of CIPC is pumped from the sump to a set of sonic resonance nozzles at a pressure of about 30 psig, and a supply of compressed air at about 70 psig is also supplied to the same nozzles within the mist chamber. The CIPC and peanut oil mixture is atomized by the nozzles, forming an aerosol containing droplets having diameters both greater and smaller than 5 microns, and a supply of circulating air is introduced into the mist chamber at the rate of about 5,000 cubic feet per minute, giving an over-pressure in the mist chamber of about $\frac{3}{4}$ inch of water. The aerosol is circulated downward through the mist chamber and upwardly through the scrubber allowing essentially only droplets of the aerosol having diameters less than about 5 microns to pass through. The aerosol which has passed through the scrubber is then introduced at the rate of 5 gallons of atomized CIPC solution per hour into the intake side of an air circulation system in the storehouse, which circulates the aerosol through the plenum of the air circulation system and through the distribution conduits of the circulation system, until 1 gallon of the CIPC solution per 200 tons of stored potatoes has been delivered and circulated within the storehouse. The aerosol circulates generally upwardly through the potatoes and the sprout-inhibiting chemical agent is deposited on the surfaces thereof.

The sprout-inhibiting chemical, a large proportion of which is in the form of minute crystallized particles, is thereby deposited on the potatoes in an even distribution, although a small amount of channeling may be observed whereby deposition of the sprout-inhibiting chemical is greater along the more open channels for passage of the aerosol through the stacked potatoes. Deposition of the sprout-inhibiting chemical on the surfaces of the potatoes is more than sufficient for inhibiting sprouting of the potatoes, yet is not above the accepted allowable maximum of 50 parts per million by weight of whole potatoes.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for creating an aerosol of a viscous liquid chemical agent at a high volumetric rate and small aerosol particle size and applying said aerosol to the surfaces of edible produce stored in an enclosure, said apparatus comprising:

(a) chemical agent supply means for providing a chemical constituent for an aerosol, said chemical agent supply means including heater means for heating said chemical agent within said chemical agent supply means and control means responsive to the temperature of said chemical agent for automatically controlling said heater means so as to maintain said chemical agent in said chemical agent supply means at a predetermined temperature in the liquid range of said chemical agent;

(b) atomizing means connected to said chemical agent supply means for atomizing said chemical agent into liquid droplets of different sizes having diameters both greater and less than a predetermined size, said atomizing means including ultrasonic nozzle means for mixing gas under pressure with said chemical agent and expanding the resultant mixture and means defining a resonator cavity associated with said nozzle means for ultrasonically subdividing said mixture, thereby forming said aerosol;

(c) separator means for removing from said aerosol those droplets of said liquid whose diameters are greater than said predetermined size, said separator means comprising vertically oriented cylindrically shaped mist chamber means for containing said mixture and ambient air supply inlet duct means for introducing a supply of circulating air separate from and in addition to said gas under pressure into said mist chamber means in a tangentially entering stream, thereby causing a cyclonic circulatory pattern within said mist chamber means;

(d) aerosol uptake conduit means located within said mist chamber means for receiving said aerosol at a position near the bottom of said mist chamber means;

(e) scrubber means presenting a large surface area in the path of flow of said aerosol for obstructing and collecting droplets having diameters greater than said predetermined size, said scrubber means being located within said aerosol uptake conduit means; and (f) discharge means for connecting to said enclosure and exhausting said aerosol from said separator means into the interior of said enclosure.

2. The apparatus of claim 1 including an enclosure having edible produce stored therein, wherein said discharge means is connected to the interior of said enclosure for exhausting said aerosol thereinto.

3. The apparatus of claim 1, including air supply fan means for moving said supply of circulating ambient air, said air supply fan means being located in said ambient air supply inlet duct means, and wherein said discharge means is free of any obstacle effectively limiting the exhaust of said aerosol into said enclosure.

4. The apparatus of claim 1 further comprising helical baffle means for creating a helical flow of said aerosol and circulating ambient air, said helical baffle means being located within said mist chamber means, wherein said atomizing means comprises a plurality of nozzles arranged in a helical pattern below said helical baffle means.

* * * * *

UNITED STATES PATENT AND TRADEMARK OFFICE
CERTIFICATE OF CORRECTION

PATENT NO. : 4,226,179

DATED : October 7, 1980

INVENTOR(S) : Dwight M. Sheldon, III. and Lee Beezhold

It is certified that error appears in the above-identified patent and that said Letters Patent are hereby corrected as shown below:

ABSTRACT, line 13 After "A" add the words --centrally located scrubber with an intake located near the bottom of the mist chamber removes essentially all particles of greater than 10 microns diameter as the aerosol exits the mist chamber. A sump at the bottom of the mist--.

Signed and Sealed this

*Twenty-seventh* Day of *January 1981*

[SEAL]

*Attest:*

RENE D. TEGTMEYER

*Attesting Officer* *Acting Commissioner of Patents and Trademarks*